(12) United States Patent
Musienko et al.

(10) Patent No.: US 11,474,265 B1
(45) Date of Patent: Oct. 18, 2022

(54) STABLE PHOTOSENSOR GAIN OVER TEMPERATURE VARIATION IN POSITRON EMISSION TOMOGRAPHY

(71) Applicant: Siemens Medical Solutions USA, Inc., Malvern, PA (US)

(72) Inventors: Mikhail Musienko, Knoxville, TN (US); Ziad Burbar, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 17/457,485

(22) Filed: Dec. 3, 2021

(51) Int. Cl.
*G01T 1/29* (2006.01)
*G01T 1/208* (2006.01)
*G01T 1/161* (2006.01)
*G01T 1/164* (2006.01)

(52) U.S. Cl.
CPC .......... *G01T 1/2985* (2013.01); *G01T 1/1612* (2013.01); *G01T 1/1648* (2013.01); *G01T 1/208* (2013.01)

(58) Field of Classification Search
CPC ... G01T 1/2985; G01T 1/1612; G01T 1/1648; G01T 1/208
See application file for complete search history.

(56) References Cited

U.S. PATENT DOCUMENTS

| 8,089,037 | B2 | 1/2012 | Schmand et al. |
| 9,734,603 | B2 | 8/2017 | Heukensfeldt Jansen et al. |
| 2010/0065723 | A1* | 3/2010 | Burbar ............... G01T 1/1648 250/214 AG |
| 2013/0092842 | A1* | 4/2013 | Zhang ............... G01T 1/2985 250/206 |
| 2018/0275309 | A1* | 9/2018 | Berheide ............ G01V 5/101 |

* cited by examiner

*Primary Examiner* — David P Porta
*Assistant Examiner* — Mamadou Faye

(57) ABSTRACT

For positron emission tomography (PET) detector gain stabilization despite temperature variation, an open loop gain control based on temperature establishes a baseline gain despite possible temperature variation. The baseline gain is then adjusted with a more sensitive closed-loop (e.g., peak tracking) approach for dealing with temperature. By combining both types of gain control to deal with temperature, the advantages of both are provided while avoiding disadvantages of either approach by itself.

20 Claims, 6 Drawing Sheets

STABLE PHOTOSENSOR GAIN OVER TEMPERATURE VARIATION IN POSITRON EMISSION TOMOGRAPHY

BACKGROUND

The present embodiments relate to positron emission tomography (PET). Solid-state detectors for PET, such as Silicon photomultipliers (SiPM) have a temperature dependency. The PET detectors are required to operate within a tight temperature range to maintain a stable photosensor gain, which impacts the energy discrimination of the system. The light output of the scintillation crystal, such as a lutecium oxyorthosilicate (LSO) crystal, of the PET detector may also be sensitive to temperature. Lower classes of LSO output less light when gamma ray annihilates with them at a higher temperature. Cool and tight temperature regulation is provided for stable and accurate energy measurements by PET detectors. Operating under a tight temperature control may be provided with an expensive liquid-cooling system and temperature compensation circuit. The expense of cooling may not be as much of an issue since SiPM systems have been targeted for high-end PET systems. The expense of cooling presents a problem for any SiPM in a lower-end PET system.

There have been attempts to temperature compensate SiPM detectors where there is an open-loop algorithm to adjust the SiPM high voltage to maintain a stable gain within a small boundary of temperature change, such as +/−3 C, without impacting image quality. However, these methods tend to deviate once the operating temperature goes beyond the tolerance. In an air-cooled PET system, the temperature variation may be 12 C or more, which variation may present an image quality issue if the gain is not corrected properly.

SUMMARY

By way of introduction, the preferred embodiments described below include methods, systems, and non-transitory computer readable media for PET detector gain stabilization despite temperature variation. An open loop gain control based on temperature establishes a baseline gain despite possible temperature variation. The baseline gain is then adjusted with a more sensitive closed-loop (e.g., peak tracking) approach for dealing with temperature. By combining both types of gain control to deal with temperature, the advantages of both are provided while avoiding disadvantages of either approach by itself.

In a first aspect, a positron emission tomography (PET) system includes a PET detector formed by a plurality of silicon photomultipliers (SiPM) adjacent to a scintillation crystal. A processor is configured to determine a first voltage based on a temperature of the PET detector, to determine an offset voltage with peak tracking, and to output a second voltage for the PET detector. The second voltage is based on both the first voltage and the offset voltage.

In one embodiment, an air-cooling system connects to cool the PET detector. The gain control stabilization despite temperature variation may be used with any PET system, such as liquid-cooled high-end PET systems or air-cooled lower-end PET systems.

In an embodiment, the processor is configured to determine the first voltage as an open loop control based on the temperature, and the processor is configured to determine the offset voltage as a closed loop control with peak tracking.

In another embodiment, the processor is configured to determine the offset voltage with the peak tracking where a source is in a field of view of the PET detector. The peak tracking is based on an energy peak of the source. In other embodiments, the processor is configured to determine the offset voltage with the peak tracking where an energy peak being tracked is of background radiation of the scintillation crystal.

In some embodiments, the processor is configured to output the second voltage within several seconds (e.g., within 2-10 seconds or within 5 seconds) of powering on the PET detector.

In one approach, the processor is configured to determine the first voltage such that an energy peak is within 5% of a set value, and the processor is configured to determine the offset voltage such that the energy peak is shifted to a discrimination level.

The first voltage and the offset voltage may be used in various ways. For example, the second voltage is a sum of the first voltage and the offset voltage. In another example, the offset voltage is an adjustment of the first voltage, also implementing a sum.

In an embodiment, the processor is configured to determine the offset voltage by equalizing energy in groups of bins on opposite sides of a set voltage.

In another embodiment, the processor is configured to determine the offset voltage within a bound range where any offset voltage from the peak tracking beyond the bound range is limited to the bound range.

In a second aspect, a method is provided for establishing gain in a positron emission tomography (PET) detector. A base gain is determined as an open loop temperature compensation. A gain adjustment is determined as a closed loop peak tracking. The gain for the PET detector is established from both the base gain and the gain adjustment.

In one embodiment, the base gain is determined based on a temperature of the PET detector. In some situations, the base gain is determined prior to powering on a high voltage source of the PET detector.

In another embodiment, the base gain is determined by setting a high voltage such that an energy peak is at or near a setup bin. The gain adjustment is determined by adjusting the high voltage so that the energy peak is at the setup bin. The energy peak may be from various sources, such as adjusting where the energy peak is a peak of a source of radiation in a field of view of the PET detector or a peak of background radiation of a crystal of the PET detector.

In yet another embodiment, the gain adjustment is determined with the gain adjustment limited to being at or within a positive limit and a negative limit.

In an embodiment, the gain is established as a sum of the base gain and the gain adjustment.

In a third aspect, a positron emission tomography (PET) detector system includes a PET detector and a voltage rail connected with the PET detector. A voltage from the voltage rail sets a PET detector gain of the PET detector. A processor is configured to use temperature compensation to set a baseline gain based on an operating temperature and to then adjust the baseline gain to the PET detector gain based on positioning an energy peak at a stable point.

In one embodiment, the processor is configured to use the temperature compensation prior to completion of powering on the voltage rail supply of the voltage to the PET detector and is configured to then adjust after the completion of the powering on of the voltage rail supply of the voltage to the PET detector.

In another embodiment, the processor is configured to bound the adjustment of the baseline gain.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

To maintain a stable photosensor gain across a wide temperature range, a combination of two or more different gain control approaches is used. This combination provides a high voltage adjustment for a stable crystal energy gain over a wide temperature range with or without a source in the field of view (FoV) and accounts for SiPM high voltage being turned off for extended periods of time. A temperature compensation algorithm is run to adjust the high voltage gain based on a current operating temperature. This allows for large differences in temperature between gain checks and does not require continuous operation. The temperature compensation algorithm sets the high voltage to ensure that the energy peak is within a small range of bins (e.g., +/−30 bins or 5%) from the setup bin (e.g., bin #720 of 1024). The energy peak aligned with the setup bin represents the stable gain. The temperature compensation approach performs well generally but does not have the desired stability. Thus, a peak tracking method is then run to finely adjust the SiPM gain around the baseline term determined with the temperature compensation algorithm. The peak tracking performs well once the temperature is stable to keep the gain stable, such as continuously or regularly setting the energy peak at the setup bin.

This coarse setting to avoid false peak locking in peak tracking followed by fine-tuning approach of peak tracking maintains an accurate crystal energy gain across a wide temperature range and operational conditions. There is little to no shift in crystal energy across a wide temperature range, such as over +/−12 or +/−20 degrees, minimizing image artifacts.

This range of operating temperature with stable gain allows use in low-cost PET systems, allowing SiPM to be used in air-cooled system and lower market. Due to the use of the temperature compensation to initialize, the PET system, including the PET detectors, is ready to scan a few seconds after the start of the system. Due to the use of the temperature compensation to avoid false peak locking and then peak tracking, the approach is robust against possible wide temperature deviations when high voltage is disabled on the SiPMs, providing accurate and stable gain once powered on due to peak tracking.

Figure 1:
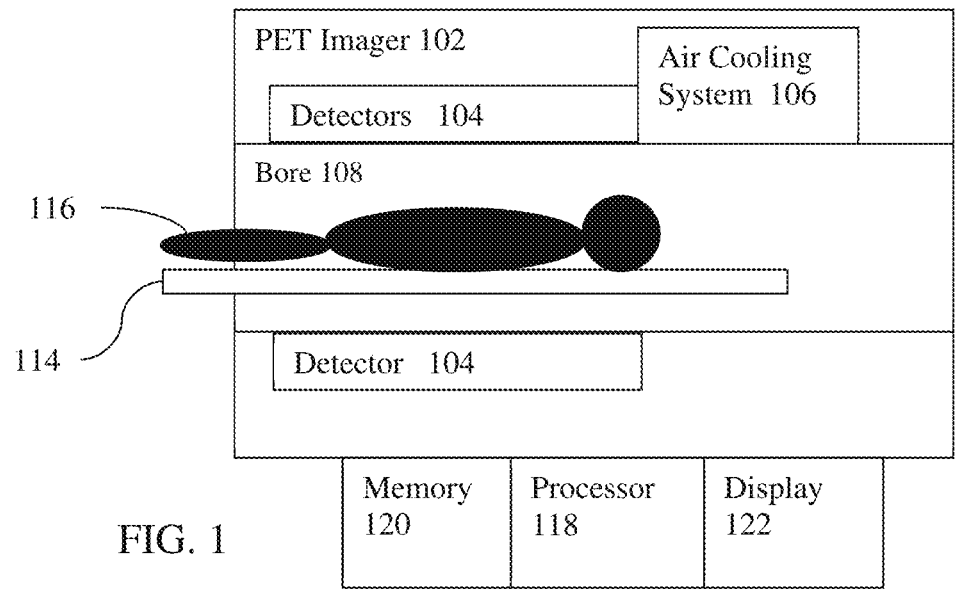
FIG. 1 is a block diagram of a PET system, according to one embodiment.

FIG. 1 shows a PET system. The PET system includes a PET detector system 200 (see FIG. 2) providing both open loop (e.g., temperature compensation) and closed loop (e.g., peak tracking) control in combination for stable gain control despite a wide range of temperature fluctuation or a wide range of operating temperatures. The PET system and PET detector system 200 perform the method of FIG. 9, the method of FIG. 10, or another method to set the gain of each detector 104 (i.e., detector block or detector electronics assembly), providing for stable gain and reducing the likelihood of artifacts due to temperature in any PET image reconstructed from emissions detected by the detectors 104.

The PET system includes a PET scanner or imager 102, air cooling system 106, and a bed 114 for the patient 116 laying in the bore 108. The processor 118, memory 120, and/or display 122 are part of the PET imager 102 or are separate (e.g., a computer or workstation). Additional, different, or fewer components may be provided. For example, the system is a computer without the PET imager 102. As another example, the PET system includes power supplies, communications systems, and user interface systems. In yet another example, no cooling system 106 is provided, or a liquid-cooling system is used.

The bed 114 is a gurney, table, or other support to hold an examination subject, such as a patient. A robot, gears, cable, track, and/or other device move the bed 114. The movement is along an axial dimension but may include other directions of movement, such as up and down. The bore 108 formed by the housing of the PET imager 102 is provided for scanning the patient. The bore 108 is cylindrical or other shape. The bed 114 moves the patient 116 into the bore 108 for and/or during PET imaging.

The PET imager 102 is a nuclear imaging system. The PET imager 102 includes a ring of detectors 104 such as scintillation crystals (e.g., LSO) coupled to solid-state detectors (e.g., SiPMs). Various solid-state or semiconductor detectors may be used. Various scintillation crystals may be used. In the example used herein, SiPMs 220 form the detectors 104 with LSO crystals 230. The detectors 104 detect gamma rays emitted indirectly by a positron-emitting tracer. Pairs of gamma rays generated by a same positron may be detected using the detectors 104 formed or stacked as a ring or cylinder around the bore 108. The pairs of gamma rays travel about 180 degrees apart. If the direction of travel intersects the arrangement of detectors 104 at two locations, a coincident pair may be detected. To distinguish specific pairs, the coincidence of detected gamma rays is determined. The timing of receipt is used to pair the detected gamma rays. The timing, as prompt data, may also indicate the time-of-flight, providing information generally about where along a line of response the emission occurred. Based on the detected event, a line-of-response is determined given the detectors involved in the detection of that event.

The energy of the detected events is also used to detect an emission event. The radiation of interest is from a particular source, so has a desired energy. For example, the radioactive source in a radiopharmaceutical ingested by the patient 116 causes a gamma ray at 511 keV. By determining that the detected emission has an energy at or near 511 keV, emissions to be counted for PET imaging may be distinguished from emissions at other sources having other energies. If the gain of the detectors 104 is off, then the energy window to distinguish emissions to be counted or not in PET imaging may be inaccurate, resulting in artifacts in images.

The detected events are passed to the memory 120 and/or processor 118. The processor 118 connects with the detectors 1104, such as through the coincidence processors. Alternatively, the processor 118 is for gain control and a separate processor operates on detected events.

The air-cooling system 106 is a fan with or without ducts for cooling the detectors 104 or other parts of the PET imager 102. The air-cooling system 106 connects to the PET detectors 104, such as connected through ducts or baffles to pass air over the PET detectors 104. A chiller and/or radiator fins may be provided for better temperature control using the air-cooling system 106. In other embodiments, a liquid-cooling system is used. In yet other embodiments, no separate cooling system is used.

Figure 2:
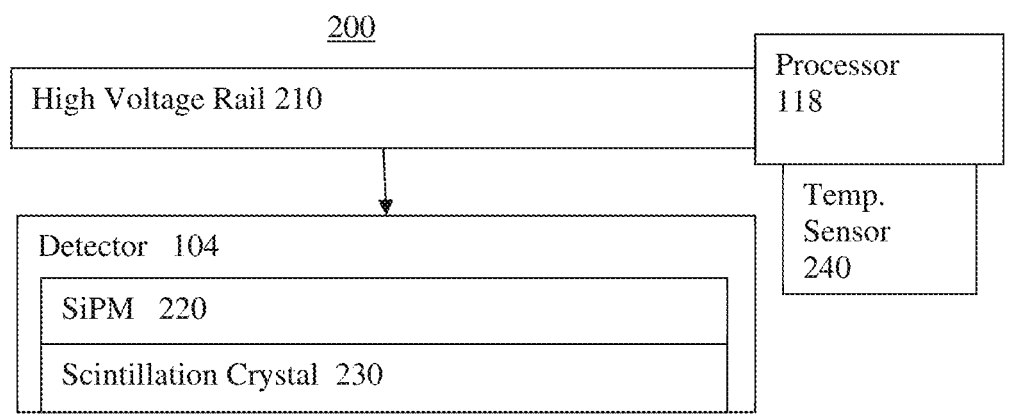
FIG. 2 is a block diagram of a PET detector system according to an embodiment.

FIG. 2 shows a PET detector system, including one of the PET detectors 104. The PET detector 104 is one of many blocks or segments forming the ring about the bore 108. The PET detector 104 includes one or more silicon photomultipliers (SiPMs) 220, such as an array of SiPMs formed by semiconductor wafer processing. A scintillation crystal or crystals 230 are positioned adjacent to the SiPMs 220.

A high voltage (e.g., tens of volts, such as up to 64 volts) rail 210 is a voltage source or conductor connected to the voltage source. High is used to distinguish from the low voltage (e.g., 1-4 volts) used to operate electronics, such as the processor 118. The high voltage rail 210 includes circuits (e.g., switches with resistor banks) for selecting or programming the voltage provided to the detector 104. The voltage from the voltage rail 210 sets a gain of the PET detector 104. Different voltages cause the detector 104 to operate at different gains.

A temperature sensor 240 with or without other sensors may be used by the processor 118 to control the voltage output to the detector 104 from the high voltage rail 210.

The processor 118 is a general processor, digital signal processor, graphics processing unit, application specific integrated circuit, artificial intelligence processor, field programmable gate array, digital circuit, analog circuit, combinations thereof, or other now known or later developed device for setting gain of the detector 104. The processor 118 is a single device, a plurality of devices, or a network. For more than one device, parallel or sequential division of processing may be used. Different devices making up the processor 118 may perform different functions, such as one processor for open-loop control and another processor for closed-loop control of the gain. In one embodiment, the processor 118 is a control processor, reconstruction processor, coincidence processor, or other processor of the PET imager 102. In other embodiments, the processor 118 is part of a separate gain control system of the PET imager 102.

The processor 118 operates pursuant to stored instructions to perform various acts described herein. The processor 118 is configured by software, firmware, and/or hardware to perform any or all the acts of FIG. 9 and/or FIG. 10.

The processor 118 is configured to set the voltage to the detector 104, controlling the gain to counter any variance due to temperature. The processor 118 sets the detector gain. In one embodiment, the setup algorithm run by the processor 118 adjusts the gains of the SiPMs so that energy peaks of all the crystals in the detectors are aligned to a certain digital bin value. The example used herein is bin 720 out of 1024. The 511 KeV energy peak of all the crystals is aligned with bin 720 for stable gain. No matter the temperature, the energy peak is to be at bin 720. Since there is a temperature dependency of SiPM where the crystal energy drifts as the temperature changes, the processor 118 changes the voltage to shift the energy peak to be at the setup or desired bin. Other bin ranges may be used. Other setup or baseline bins may be used. In yet other embodiments, histograms or bins are not used but the analog energy curve is set by the voltage to provide a desired gain regardless of temperature.

Figure 3:
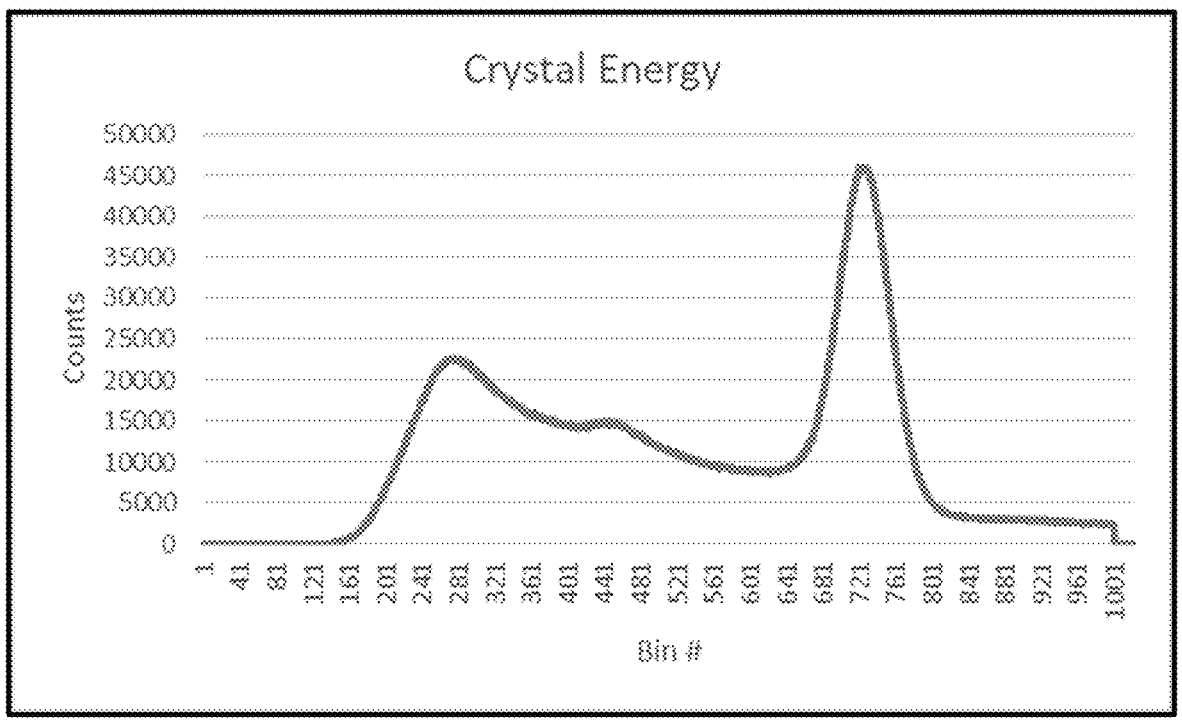
FIG. 3 is a graph illustrating an example energy distribution with a peak energy at a set bin for gain control.
Figure 4:
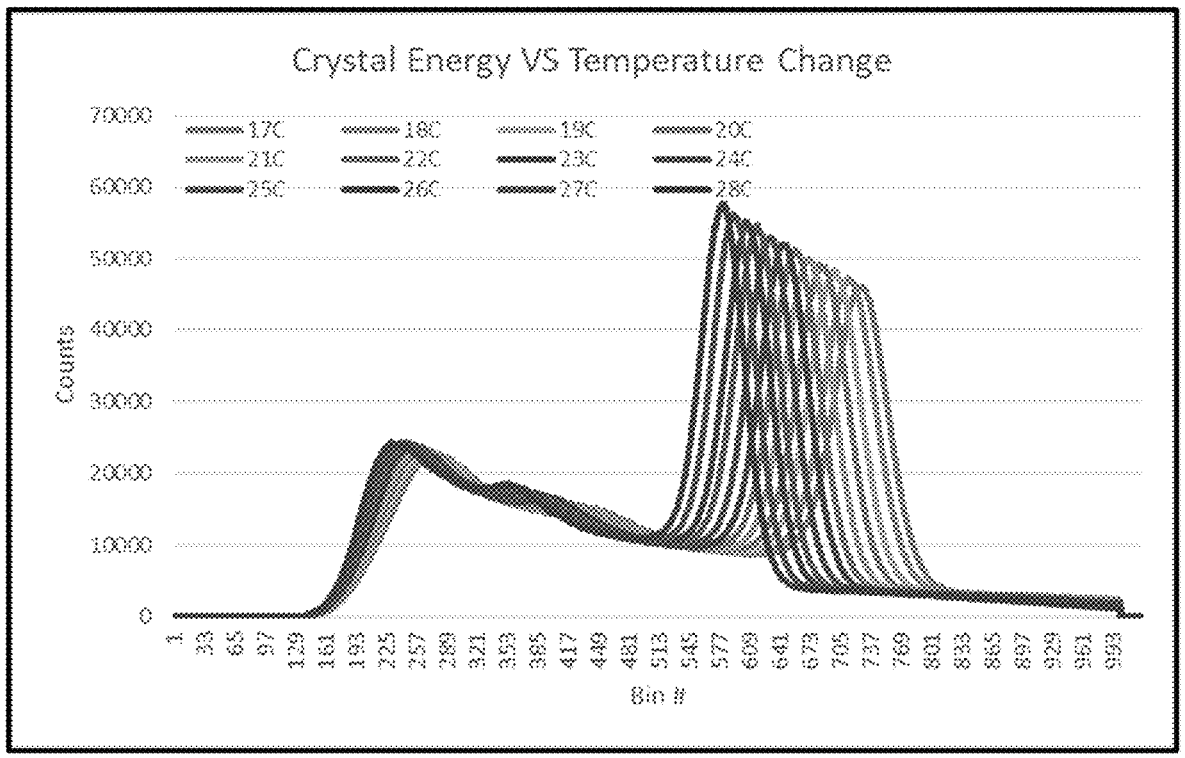
FIG. 4 is a graph illustrating example shifting of the energy distribution due to temperature.

FIG. 3 shows a crystal energy histogram of a detector block setup correctly where the energy peak of the counts is at bin 720. FIG. 4 shows the same detector block where the SiPM gain was setup at a temperature of 17 C to align the energy peak with bin 720. Without changing the SiPM gain, the operating temperature was varied by 1 C steps to 28 C (i.e., +11 C total). Time to reach temperature stability is provided after each 1 C step and before counting emissions from a source. Crystal energy data was acquired after each step. The energy data for each temperature was histogrammed to show energy peak location. FIG. 4 shows a drift of the energy peak while varying the temperature. As the temperature goes up, the energy peak shifts to a lower bin. For example, at 28 C, the energy peak is at bin 577, a shift of 143 bins or about 14%. Without control to counteract, the gain is not correct due to the difference in temperature.

Figure 5:
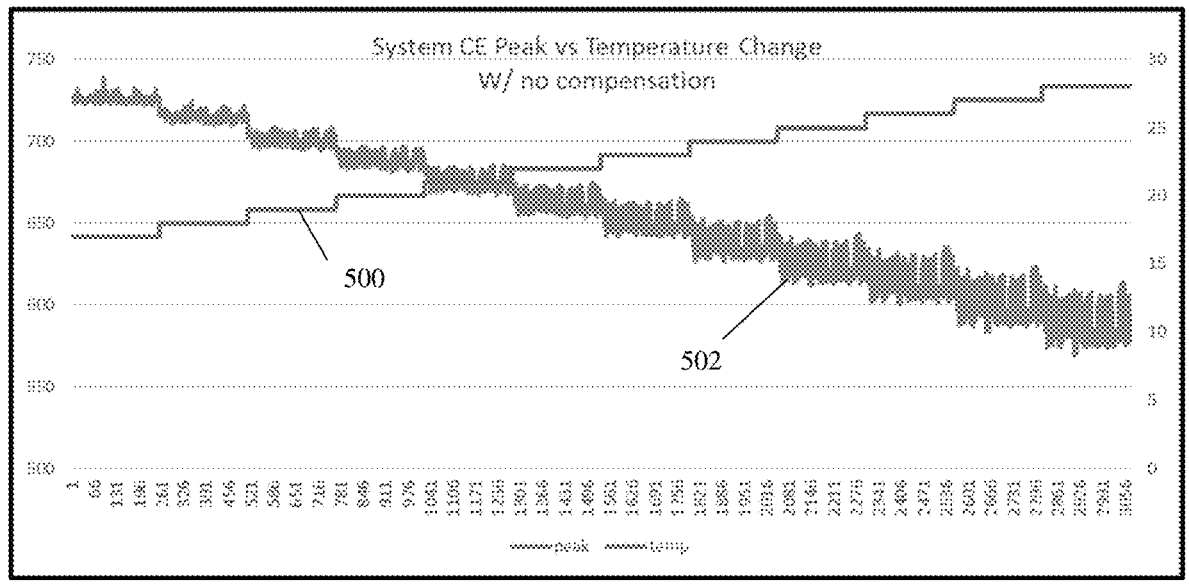
FIG. 5 is a graph illustrating example energy peak shift in PET detectors due to temperature change.

FIG. 5 is a graph illustrating a plurality of detectors 104 (e.g., all detector blocks or detector electronics assemblies) in a given PET imager 102. The temperature 500 starts at 17 C (right vertical index) and steps at 1 C increments to 28 C. At each temperature, the bins (left vertical index) of the energy peaks 502 for all the detectors are plotted. The horizontal index is a data point count, such as providing 256 points per temperature for 256 detectors 104. Looking at all the detectors 104 (e.g., detector electronics assemblies (DEAs)) in a system, FIG. 5 shows all the crystal energy peaks of all the blocks in a PET imager 102 plotted at each set temperature with no temperature compensation correction applied. There is a mean of 120 bin shift in the crystal energy from 17 C to 28 C. This translates to about 85 KeV. This much drift in the energy measurements causes inaccurate measurements and bad image quality.

The processor 118 is configured to set the gain to avoid the drift caused by temperature. For any given temperature, the gain is to be set so that the energy peak is at or near (e.g., within 1%) of the setup bin. First, a coarse setting is provided. The processor 118 determines a base voltage based on a temperature of the PET detector 104. The base voltage is determined as part of an open-loop control based on the temperature. The voltage is selected from a look-up table given a temperature sensed by the sensor 240.

In one embodiment, the processor 118 is configured to use temperature compensation to set the baseline gain based on an operating temperature of the detector 104. For example, the open-loop temperature compensation taught in U.S. Published Patent Application No. 2013/0092842 is used. Other inputs for control may be used, such as counts where the detector 104 is powered and active. Any function relating the input measures to the output voltage may be used. In one embodiment, a derivative of temperature is used. Where counts are not available, such as at startup, the temperature alone may be used.

Unlike closed-loop control with peak tracking, the baseline gain and corresponding voltage may be set even where the setup or start sequence of the detector 104 and/or PET imager 102 in incomplete. The temperature compensation approach or algorithm is used prior to completion of powering on the voltage rail 210 supply of the voltage to the PET detector 104. The initial gain is set during PET detector 104 setup or configuration for imaging. The open-loop control may be used after powering on in other embodiments.

Open-loop control or temperature compensation determines the voltage for the detector 104 such that an energy peak is within 5% of the set or desired gain (e.g., of bin 720). For example, the energy peak is within 30 bins (e.g., ~3%) of bin 720 using this approach. The energy peak may be at bin 720 or close to bin 720.

Temperature compensation is different than closed-loop approaches, such as peak tracking. Peak tracking typically works where the temperature variation is within few degrees C. Thus, operating at a wider temperature introduces non-linear response to the gain. Temperature compensation is used to initialize or set the gain so that the energy peak is close to the desired set point or bin, avoiding the risk of non-linear response to locking on an incorrect peak in peak tracking. The open-loop control counteracts large temperate variation, allowing subsequent closed-loop control to operate as if there is a smaller temperature variation.

Figure 6:
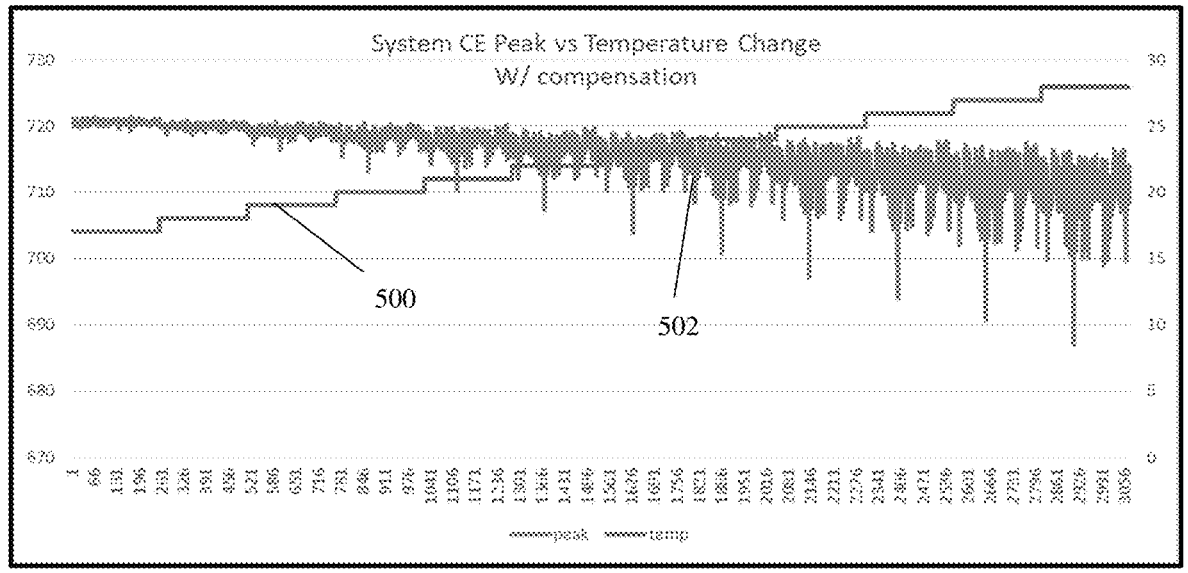
FIG. 6 is a graph illustrating example energy peak shift as limited by open-loop temperature compensation.

FIG. 6 shows system detectors (e.g., DEAs) setup at 17 C (right index). The energy peaks are at or near bin 720 (left index). The operating temperature 500 was varied by 1 C to 28 C, allowing for temperature stability after each temperature step. Then, the crystal energy was acquired and histogrammed with the temperature compensation method using operating temperature enabled to correct the detector gain throughout the measurements. As shown, the energy peak for the blocks of detectors 104 start to deviate by a few bins as the temperature increases. Within 11 C temperature change, some blocked crystal energy peaks shifted as much as 30 bins. This translates to 22 KeV energy shift, which may cause image artifacts but less than with no compensation. These 30 bins or 22 keV is substantially less than the 120 bins or 85 keV of FIG. 5.

Once the open-loop temperature compensation approach places the energy peak closer to the setup bin, the processor 118 is configured to determine an offset voltage with peak tracking or other closed-loop process to refine the placement of the energy peak (i.e., refine the gain setting) to a discrimination level. Any form of peak tracking may be used. The energy of the counts is plotted, a curve fit to the bin counts, and then the greatest peak is identified. Low pass filtering may be used to avoid false or high frequency peaks. The identified peak is then shifted to be at the setup or baseline bin (e.g., bin 720). In one embodiment, one of the peak tracking approaches in U.S. Pat. No. 8,089,037 or 9,734,603 is used. In another embodiment, sums or averages of energies over ranges on each side of the setup or baseline bin for stable gain are equalized. For example, the energies or bin counts for 20 bins on one side (e.g., 700-719) and for 20 bins on the other side (e.g., 721-740) are separately summed. The bins are shifted towards the lower sum by a set amount or an amount based on the difference or ratio of the sums. The process continues until the energy in the groups of bins on opposite sides of the setup or baseline bin are equalized. The amount of shift to equalize provides the offset voltage for the fine tuning of the gain.

The high voltage is adjusted based of the delta shift of the peak back to bin 720. These methods usually track 511 KeV peak in PET. The peak tracking is run continuously or frequently (e.g., every 10 seconds). Peak tracking tends to have a more accurate gain setting than temperature compensation or other open-loop setting as long as the peak tracking is capable of detecting and tracking the peak. Peak tracking may perform poorly where the wrong peak is identified, such as where temperature at the beginning of the peak tracking causes a different peak to be near the setup bin.

Figure 7:
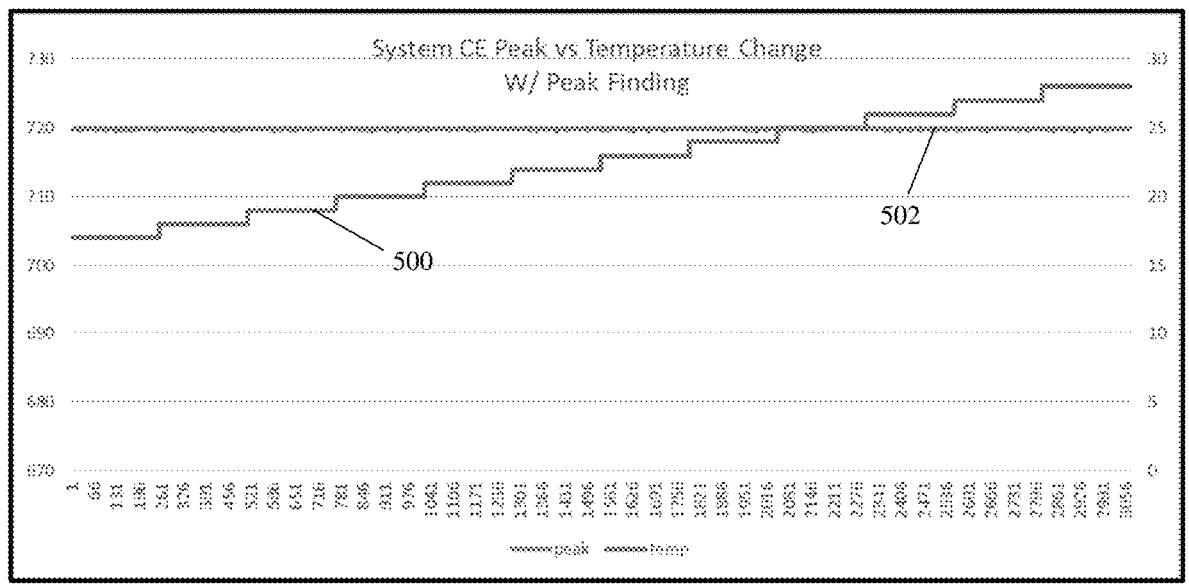
FIG. 7 is a graph illustrating example energy peak shift as limited by closed-loop peak tracking.

FIG. 7 shows the use of peak tracking locked onto the correct peak. The detector at 17 C was used first. The peak tracking was run continuously throughout the measurements for adjusting the high voltage to control the gain. The operating temperature was varied by 1 C to 28 C, allowing sometime for temperature stability. Then, the crystal energy was acquired and histogrammed. The histograms of the energy peaks for the system detectors 104 (e.g., DEAs) remain at bin 720 with +/−1 bin using peak tracking.

Other closed-loop controls and/or other peak tracking may be used to determine the offset voltage. The closed-loop control is performed after the temperature compensation so that the correct peak (e.g., 511 keV) is likely near the setup bin or bin for stable gain. The peak tracking then adjusts the baseline gain to the PET detector gain based on positioning the energy peak at a stable point (e.g., bin 720). The offset voltage is selected or set so that the energy peak is shifted to the set or desired stable gain.

The source is positioned in the field of view of the PET detector 104 for the peak tracking or other closed-loop control. The source may be the radiopharmaceutical in the patient. After powering on and setting up the PET detectors 104 and placing the source in the field of view, the emissions from the source are detected. The peak finding term finds the peak at 511 KeV where there is activity in the field of view.

In another embodiment, a source in the field of view is not provided or used. Instead of placing a source to cause emissions in the field of view, background radiation may be used. For example, LSO as a scintillation crystal generates background radiation emissions with energy peaks at 202 keV and 307 keV, which peaks may be used in peak tracking if no activity is detected in the field of view. The offset voltage to fine tune with peak tracking uses one or both of the energy peaks (e.g., the greater energy peak of 307 keV) from the crystal. Other types of crystals may have energy peaks at other energies.

Figure 8:
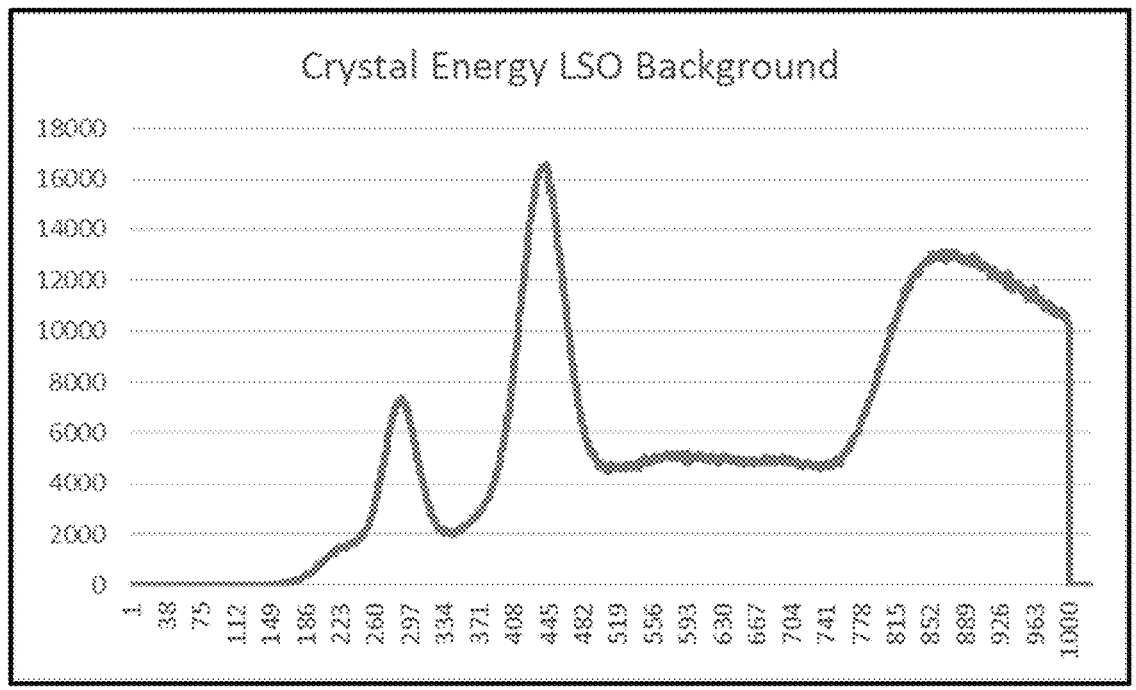
FIG. 8 is a graph illustrating an example energy distribution for background radiation from an LSO crystal of a PET detector.

FIG. 8 shows the energy distribution in a histogram from detected emissions from the LSO. Where a source is not available (e.g., not having 511 KeV peak to run the peak finding), other peaks that exist when 511 KeV is not present may be used. LSO has background radiation that can be detected when there is no activity in the field of view. The LSO background radiation has major peak at 307 KeV and anther at 202 KeV. In this example, the 307 keV peak is at bin 445, and the 202 keV peak is at bin 290. These peaks also shift due to temperature changes on the SiPM. These peaks shift with respect to the bins due to change in temperature. Thus, tracking one or both peaks when there is no 511 KeV and adjusting the high voltage based on the tracking is an alternative solution.

The limitation of peak drifting outside the boundary or range of bins used in peak tracking may still be an issue. Furthermore, the combined peak from 307 KeV and 202 KeV (i.e., around bins 825-100) of LSO or presence of other isotopes that emit single photons with energy peaks at energy other than 511 KeV may lay on the top of the 511 KeV at greater temperatures (i.e., may be adjacent to bin 720), causing peak tracking locking on incorrect peak causing system instability. Without temperature compensation to set the initial or base high voltage, the peak tracking may not operate correctly where temperature variation over more than a few degrees is possible.

Peak tracking has some limitations limiting efficiency and robustness. At the start of peak tracking, the 511 KeV or 307 KeV peak needs to be within the boundaries (e.g., energy or bin range used for equalization). The peak being drifted beyond the limits may cause error and inaccurate results. The operating temperature cannot vary for more than couple of degrees while the peak tracking is not in operation (i.e., no 511 KeV or 307 KeV peak), or the peak may have drifted too far (see FIG. 4 showing drift by temperature) for peak tracking to operate correctly. SiPM high voltage remains off for most of the time except for scanning time to preserve the operating life of the SiPM. During that time, the peak tracking cannot operate. During these extended periods without high voltage enabled is when the system is expected to have most temperature variations. Starting the peak tracking when the temperature varied significantly has the potential to incorrectly lock in and track incorrect signal peaks, such as the combined peak from 307 KeV and 202 KeV, or from isotopes that emit multi gamma rays such as Ga-68, I-124, etc.

The temperature compensation is performed to initialize the peak tracking to avoid or limit the limitations of peak tracking. This combination of both open-loop and closed-loop gain control provides a high voltage adjustment for a stable crystal energy gain over a wide temperature range with or without a source in the FoV. The use of temperature compensation accounts for SiPM high voltage being turned off for extended periods of time, while the subsequent peak tracking provides greater gain stability. The temperature compensation algorithm adjusts the high voltage for detector gain based on the current operating temperature. As shown in FIG. 6, the temperature compensation algorithm sets the high voltage to ensure the energy peak is within a small range of bins (e.g., within 20 or 30 bins) from the setup bin (bin #720). The peak tracking algorithm is then run to finely adjust the SiPM gain around the baseline term determined with the temperature compensation algorithm, narrowing the energy peak to be within a few bins (e.g., +/−2 or 3 bins) of the setup bin. The peak tracking is used to adjust the voltage for setting the gain after completion of powering on the voltage rail supply of the voltage to the PET detector based on the detected emissions detected using the temperature compensation-based gain.

The peak tracking may be further limited to avoid incorrect peak locking even with temperature compensation. The peak-tracking-based adjustment of the baseline gain set by temperature compensation is bounded. The range of gain adjustment and corresponding offset voltage for peak tracking is limited. The offset voltage determined by peak tracking is within a bound range so that any offset voltage found to be beyond the bound range is limited to the extreme of the bound range. The additive term of the peak tracking is bounded to a range wide enough to account for temperature compensation component inaccuracy but small enough not to impact baseline term performance in case of incorrect peak locking. For example, the bound range of the offset voltage is +/−0.1 volts where the voltage from the high voltage rail has a dynamic range of 0-64 volts (e.g., base voltage of 58.7 volts). Other bounds with equal or unequal positive and negative limits may be used. Bounding prevents the peak finding term from causing instability, thus allowing the open loop term to put the detector gain to a stable range (combining the accuracy of peak tracking algorithm with robustness of the temperature compensation algorithm). In other embodiments, no limitation or bounding of the offset voltage or adjustment of peak tracking is used.

The processor 118 is configured to determine a voltage for the PET detector 104. The processor 118 controls the high voltage rail 210 to provide the output voltage for stable gain despite temperature variation. The voltage for stable gain is based on both the voltage from the temperature compensation or other open-loop control and the voltage from the peak tracking or other closed-loop control. In one embodiment, the final or stable voltage is the baseline voltage from temperature compensation summed with the offset voltage from the peak tracking. For example, the offset voltage is a voltage adjustment adding or subtracting from the base voltage set by the temperature compensation.

The voltage for stable gain is determined separately for each detector block. The PET detector 104 is one block of many in the ring of detectors. Each PET detector 104 or block may be subjected to different temperature and/or have different temperature response, so the voltages provided to the different PET detectors 104 may be the same or different to provide the stable gain by each PET detector 104.

The voltage to use for scanning the patient is provided within a minute or less of powering on the PET detector 104. The temperature compensation may provide an initial voltage used to power on. The peak tracking then uses emissions detected in a short time frame, such as the first 1 second, 5 seconds, 10 seconds, or 30 seconds to adjust the voltage. The peak tracking then continues as long as the PET detector 104 is powered for detecting for a given patient. A window of a given number of most recent detected emissions or the emissions over a most recent time are used to form the histogram for peak tracking at any given time.

The processor 118 or a different processor is configured to reconstruct the activity distribution in PET imaging using the detected emissions. Due to the gain setting performed at regular times (e.g., every 30 seconds) or continuously, the gain is maintained despite temperature changes as the PET detectors 104 warm up due to use. Detected emissions with stable gain along lines of response are used to reconstruct the activity distribution. Due to the stable gain over temperature variation, the energy windowing applied to the detected emissions is more accurate so that only emissions at the desired energy window are used in the reconstruction.

The processor 118 uses the events (e.g., line-of-response events or PET data), temperature, histogram, setup bin identification, peak energy, bin sums, and/or other information stored in the memory 120 for processing. For processing, the data bypasses the memory 120, is temporarily stored in the memory 120, or is loaded from the memory 120. The data is stored in any format.

The memory 120 is a buffer, cache, RAM, removable media, hard drive, magnetic, optical, database, or other now known or later developed memory. The memory 120 is a single device or group of two or more devices. The memory 120 is part of the PET imager 102 or a remote workstation or database, such as a PACS memory.

The memory 120 is additionally or alternatively a non-transitory computer readable storage medium with processing instructions. The memory 120 stores data representing instructions executable by the programmed processor 118 for determining voltages for the PET detectors 104 to provide gain stable at various temperatures. The instructions for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The display 122 is a CRT, LCD, plasma screen, projector, printer, or other output device for showing a PET image of the activity distribution. The PET image may be a qualitative or quantitative image. The image of the patient may have fewer artifacts due to the stable gain provided by the combination of temperature compensation and peak tracking.

Figure 9:
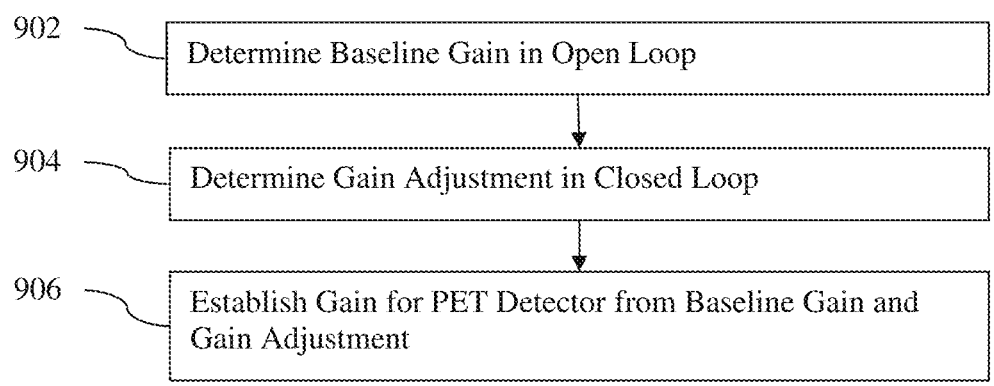
FIG. 9 is a flow chart diagram of one embodiment of a method for establishing gain in a PET detector.
Figure 10:
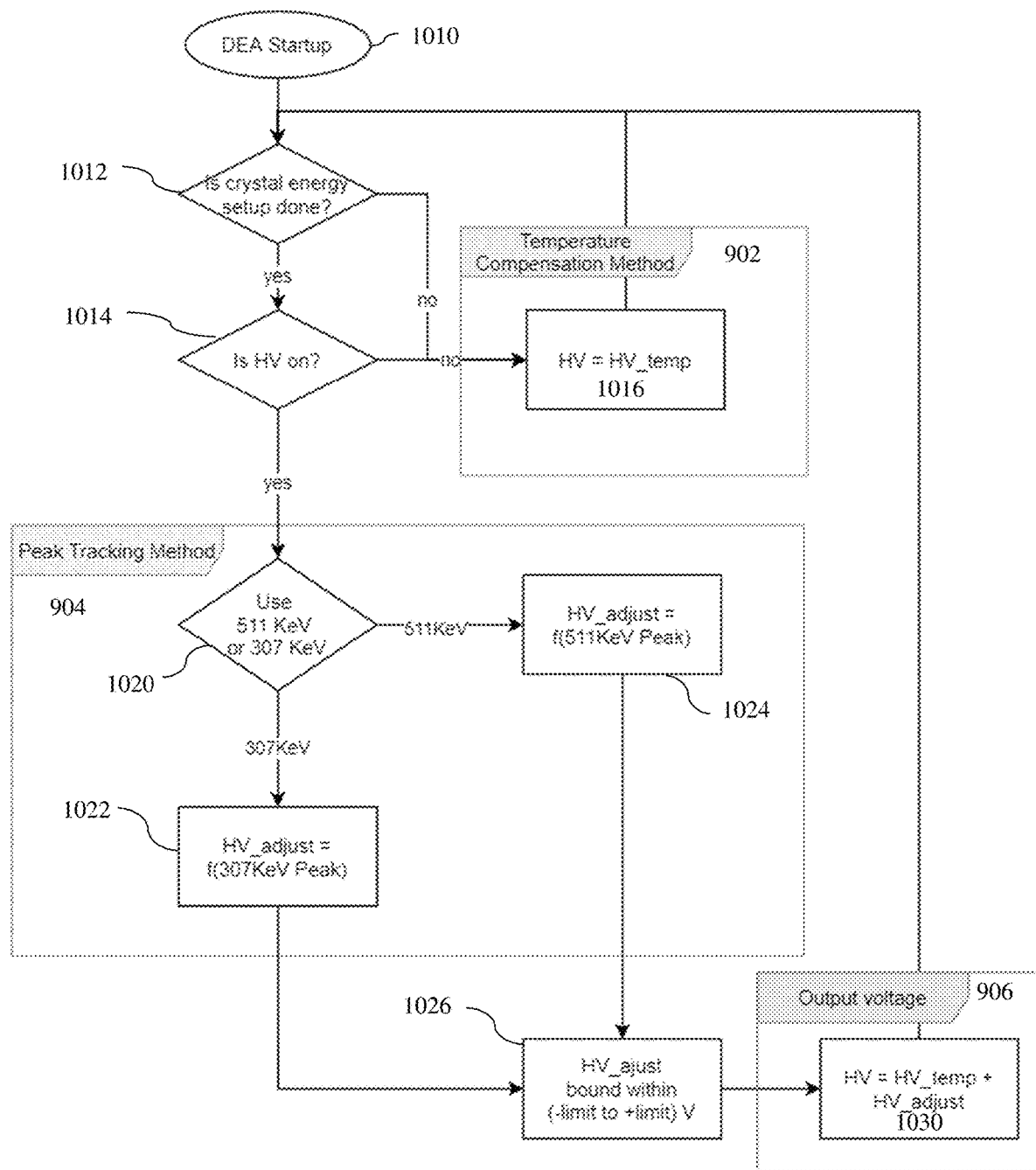
FIG. 10 is a flow chart diagram of another embodiment of a method for establishing gain in a PET detector.

FIG. 9 shows one embodiment of a method for establishing gain in a positron emission tomography (PET) detector. A combination of open-loop and closed-loop control of the voltage to the PET detector is used to establish a stable gain despite operating at different temperatures. FIG. 10 shows one embodiment of the method of FIG. 9 using temperature compensation for the open-loop control and peak tracking for the closed-loop control.

The methods of FIGS. 9 and 10 are implemented by the processor 118, PET imager 102, voltage rail 210, and/or another component or system. For example, the processor 118 or another circuit performs acts 902, 904, and 906. The voltage rail 210 then provides the voltage for the established gain to the PET detector 104 based on the determinations from the processor 118. Other components may perform the acts.

Additional, different, or fewer acts may be performed. For example, acts for selecting a peak energy to use (e.g., act 1020) and the corresponding act for the unavailable energy peak (e.g., act 1022 or 1024) are not provided. As another example, act 1026 for limiting the adjustment provided by peak tracking at any given instance is not provided. The acts are performed in the order shown (e.g., numerical, top to bottom, or following decision criteria) or a different order.

In act 902, the processor determines a base gain. An open-loop process, such as temperature compensation, is used to determine this base gain. A temperature of the PET detector or a temperature from an object or air near the PET detector is used to establish a voltage for the PET detector, such as 55.30 volts. This voltage positions the peak energy near the stable point, such as bin 720, providing the base gain for the given temperature.

The determination may be performed prior to powering on a high voltage source of the PET detector. Alternatively, the determination is performed while powering on or after having already powered on the high voltage source of the PET detector.

In the example of FIG. 10, the startup for the detector electronics assembly is initiated at act 1010, such as by configuring or starting the PET imager. As part of this startup, the crystal energy setup is performed. In act 1012, the gain control checks whether the crystal energy setup is done. If done, then a check is performed for whether the high voltage to the PET detector is on in act 1014. If the answer is no for either of acts 1012 or 1014, then the temperature compensation method is run in act 902. The temperature compensation determines a high voltage to be provided to the PET detector based on the temperature (i.e., HV_temp 1016). This absolute voltage is then provided to the PET detector when the high voltage supply is turned on. In other embodiments, act 902 is performed without either or both checks of acts 1012 or 1014, such as performing act 902 as an initial stage of gain control regardless of status of the crystal energy setup or high voltage supply being on.

Referring again to FIG. 9, the processor determines a gain adjustment in act 904. A closed-loop process is used, such as peak tracking. The process relies on the base gain as a starting point. This initialization may avoid limitations of the closed-loop process.

The adjustment may be a new gain setting or may be a difference or change in the gain setting. For example, the high voltage being supplied to the PET detector is adjusted by an offset or change in voltage so that the absolute voltage to the PET detector is different. The difference shifts the energy peak to the setup bin or stable gain point, providing the gain adjustment.

Any source of radiation may be used for the adjustment. For example, the source of radiation is a source in the field of view of the PET detector, such as a source having peak energy at 511 keV. As another example, the source of radiation is the scintillation crystal of the PET detector. No source is provided in the field of view, and the background crystal radiation, such as LSO background radiation with energy peaks at 307 keV or 202 keV, is detected.

The adjustment may be limited. The gain adjustment may have positive and negative limits to the amount of change. If the adjustment due to the closed-loop process reach one of the limits, then the adjustment used is the limit. A greater positive or negative adjustment is not allowed. In other embodiments, a limit is not provided. In yet other embodiments, the limit is an absolute voltage, such as not setting the voltage for the gain below a certain value or above another certain value regardless of the amount of change.

In the example of FIG. 10, once the high voltage supply to the PET detector is on, the PET detector detects emissions. This allows the peak tracking method of act 904. In act 1020, the energy peak to be used for peak tracking is selected. In the example shown, the selection is between 511 keV for a source in the field of view or 307 keV where radiation from LSO is to be the source without any source in the field of view. Where 511 keV is selected, then the peak tracking function is implemented in act 1024 to find the adjustment to the base gain. Where 307 keV is selected, then the peak tracking function is implemented in act 1026 to find the adjustment to the base gain. In act 1026, the adjustment is checked against any limits, such as being bounded to be at or between a negative limit and a positive limit on change. The voltage of the adjustment is limited.

Referring again to FIG. 9, the processor establishes the gain for the PET detector in act 906. The gain is established from both the base gain of act 902 and the gain adjustment of act 904. The adjustment is applied to the base gain, resulting in a temperature-controlled gain. For example, the base voltage is adjusted by the offset voltage in act 906, providing the voltage 1030 in FIG. 10 to be used. The voltages are summed to provide the voltage to be used for establishing gain at a given time.

The peak tracking in act 904 may continue until the voltage to the PET detectors is turned off. Once turned off, then the temperature compensation of act 902 is performed again upon the next power up cycle.

The PET detectors, as powered by the controlled gain, detect emissions from the patient. These emissions are used to reconstruction a representation of the function in the patient. A PET image is generated. The PET image may have fewer artifacts or be better (e.g., formed from more emissions from the patient) despite temperature variation due to the stability of the gain over temperature.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A positron emission tomography (PET) system comprising:
    a PET detector formed by a plurality of silicon photomultipliers (SiPM) adjacent to a scintillation crystal; and
    a processor configured to determine a first voltage based on a temperature of the PET detector, to determine an offset voltage with peak tracking, and to determine a second voltage for the PET detector, the second voltage based on both the first voltage and the offset voltage.

2. The PET system of claim 1 further comprising an air-cooling system connected to cool the PET detector.

3. The PET system of claim 1 wherein the processor is configured to determine the first voltage as an open loop control based on the temperature, and the processor is configured to determine the offset voltage as a closed loop control with peak tracking.

4. The PET system of claim 1 wherein the processor is configured to determine the offset voltage with the peak tracking where a source is in a field of view of the PET detector, the peak tracking based on an energy peak of the source.

5. The PET system of claim 1 wherein the processor is configured to determine the offset voltage with the peak tracking where an energy peak being tracked is of background radiation of the scintillation crystal.

6. The PET system of claim 1 wherein the processor is configured to determine the second voltage within a five seconds of powering on the PET detector.

7. The PET system of claim 1 wherein the processor is configured to determine the first voltage such that an energy peak is within 5% of a set value, and wherein the processor is configured to determine the offset voltage such that the energy peak is shifted to a discrimination level.

8. The PET system of claim 1 wherein the processor is configured to determine the second voltage as a sum of the first voltage and the offset voltage.

9. The PET system of claim 1 wherein the processor is configured to determine the offset voltage by equalizing energy in groups of bins on opposite sides of a set voltage.

10. The PET system of claim 1 wherein the processor is configured to determine the offset voltage within a bound range where any offset voltage from the peak tracking beyond the bound range is limited to the bound range.

11. A method for establishing gain in a positron emission tomography (PET) detector, the method comprising:
    determining a base gain as an open loop temperature compensation;
    determining a gain adjustment as a closed loop peak tracking; and
    establishing the gain for the PET detector from both the base gain and the gain adjustment.

12. The method of claim 11 wherein determining the base gain comprises determining based on a temperature of the PET detector.

13. The method of claim 11 wherein determining the base gain comprises determining prior to powering on a high voltage source of the PET detector.

14. The method of claim 11 wherein determining the base gain comprises setting a high voltage such that an energy peak is at or near a setup bin, and wherein determining the gain adjustment comprises adjusting the high voltage so that the energy peak is at the setup bin.

15. The method of claim 14 wherein adjusting comprises adjusting where the energy peak is a peak of a source of radiation in a field of view of the PET detector or a peak of background radiation of a crystal of the PET detector.

16. The method of claim 11 wherein determining the gain adjustment comprises determining the gain adjustment with the gain adjustment limited to being at or within a positive limit and a negative limit.

17. The method of claim 11 wherein establishing the gain comprises establishing as a sum of the base gain and the gain adjustment.

18. A positron emission tomography (PET) detector system comprising:
    a PET detector;
    a voltage rail connected with the PET detector, a voltage from the voltage rail setting a PET detector gain of the PET detector; and
    a processor configured to use temperature compensation to set a baseline gain based on an operating temperature and to then adjust the baseline gain to the PET detector gain based on positioning an energy peak at a stable point.

19. The PET detector system of claim 18 wherein the processor is configured to use the temperature compensation prior to completion of powering on the voltage rail supply of the voltage to the PET detector and is configured to then adjust after the completion of the powering on of the voltage rail supply of the voltage to the PET detector.

20. The PET detector system of claim 18 wherein the processor is configured to bound the adjustment of the baseline gain.

* * * * *